(12) United States Patent
Ashby et al.

(10) Patent No.: US 6,179,388 B1
(45) Date of Patent: Jan. 30, 2001

(54) METHOD OF MAKING A WHEEL

(75) Inventors: Gregory Ashby, Walderslade; Terence Roy Crowe, Shrewsbury, both of (GB)

(73) Assignee: GKN Sankey Limited, Shropshire (GB)

(*) Notice: Under 35 U.S.C. 154(b), the term of this patent shall be extended for 0 days.

(21) Appl. No.: 09/300,046

(22) Filed: Apr. 27, 1999

(30) Foreign Application Priority Data

Apr. 30, 1998 (GB) .................................................. 9809117

(51) Int. Cl.$^7$ ................................ B60B 3/10; B60B 25/00
(52) U.S. Cl. .......................................... 301/63.1; 301/11.1
(58) Field of Search ................................ 301/63.1, 29.2, 301/10.1, 11.1, 35.1, 35.62, 9.1, 9.2; 29/894.323

(56) References Cited

U.S. PATENT DOCUMENTS

| | | | |
|---|---|---|---|
| 1,652,752 | * 12/1927 | Bendix | 301/63.1 |
| 1,880,641 | * 10/1932 | Woodward | 301/63.1 |
| 2,083,066 | * 6/1937 | Hunt | 301/63.1 |
| 2,209,030 | * 7/1940 | MacDonald | 301/11.1 |
| 2,237,481 | * 4/1941 | Ferro | 301/35.62 |
| 2,363,182 | * 11/1944 | Hunt et al. | 301/11.1 |
| 4,836,261 | * 6/1989 | Weeks et al. | 152/405 |
| 5,197,785 | * 3/1993 | Berry | 301/63.1 |
| 5,380,071 | 1/1995 | Kier, Jr. . | |
| 5,938,291 | * 8/1999 | Pankhurst et al. | 301/9.2 |
| 6,027,176 | * 2/2000 | Kuhl et al. | 301/11.1 |

FOREIGN PATENT DOCUMENTS 241788    3/1925 (GB) .
2 285 957  8/1995 (GB) .

\* cited by examiner

Primary Examiner—S. Joseph Morano
Assistant Examiner—Long Bao Nguyen
(74) Attorney, Agent, or Firm—Marshall, O'Toole, Gerstein, Murray & Borun

(57) ABSTRACT

A method of making a wheel from a rim selected from a plurality of rims of different nominal diameters, a plurality of flanges of different configurations, and a disc, the method including selecting from the plurality of rims a rim of a desired diameter, selecting from the plurality of flanges a flange of an appropriate configuration so that when the flange is secured to the rim, the flange provides a mounting for the disc, and mounting the disc in the rim by attaching the disc to the flange.

11 Claims, 1 Drawing Sheet

METHOD OF MAKING A WHEEL

BACKGROUND TO THE INVENTION

This invention relates to a method of making a wheel and more particularly but not exclusively a ground engaging wheel for a vehicle such as a tractor or an excavating/loading or like vehicle or machine. However the invention may be applied to a method of making a wheel for another purpose, although preferably for a ground engaging wheel of a vehicle or machine.

DESCRIPTION OF THE PRIOR ART

Tractor wheels for example, are made in different sizes to suit the vehicles on which the wheels are used. Tractor wheels made by different manufacturing methods are known.

First, a tractor wheel may be made by fixing a, usually round, disc in a rim, for example by welding. The configuration of the wheel is thus fixed and to produce a range of wheels of different diameters it is necessary to make a range of rims of varying diameter, and to make a range of discs of matching size. It is common for the disc of such a wheel to be fixed in the rim by means of a flange means which is secured to the rim and provides a mounting for the disc.

Thus for example, to produce a range of three wheel diameters, three alternative rims and three alternative discs need to be produced although a common configuration flange means for the wheels may be used.

Second, a tractor wheel may be made by securing in the rim e.g. by welding, a plurality of lugs to which the disc is attached at discrete mounting positions. The disc is usually nominally square with the corners removed to provide mounting positions.

Such a construction has the advantage over a fixed disc wheel that the disc may be mounted on either side of the lugs, with or without spacers, and the disc may be reversed, so as to provide a variety of wheel configurations so that the tracking between a pair of such wheels on a common axle, may be changed. This is a desirable feature for farmers for example who may require the tracking to be set to match the distance between furrows for example, in a field. Hence the disc is usually attached to the lugs by fastenings such as bolts which are releasable to enable track adjustments to be made.

With such a construction, to produce a range of wheels of different diameters it is necessary to make a range of rims of varying diameter as in the first construction described, and again to make a range of discs of matching size.

Thus again, to produce a range of three wheel diameters, three alternative rims and three alternative discs need to be produced although a common configuration lugs for the wheels may be used.

Third, to provide a wheel construction having sufficient torque strength for use on a modern higher power tractor, whilst being adjustable to accommodate different desired track widths, a construction similar to the lug construction described may be used but in which there is a flange means secured in the rim, e.g. by welding, rather than lugs. A disc is thus fixed in the rim by attaching the disc to the flange means, usually at discrete mounting positions provided by the flange means, again by means of releasable fastenings.

Again to produce a range of say, three wheel diameter sizes, three alternative diameter rims, and three alternative size discs are required, although a common flange configuration for the three wheel sizes may be used.

In each case described, it is necessary to produce a range of discs in order to provide different sized wheels which is expensive in terms of tooling and production.

SUMMARY OF THE INVENTION

According to the first aspect of the invention we provide a method of making a wheel from a rim selected from a plurality of rims of different nominal diameters, a plurality of flange means of different configurations, and a disc, the method comprising selecting from the plurality of rims a rim of a desired diameter, selecting from the plurality of flange means a flange means of an appropriate configuration so that when the flange means is secured to the rim, the flange means provides a mounting for the disc, and mounting the disc in the rim by attaching the disc to the flange means.

Thus in contrast with all of the prior art methods described, a range of wheels of alternative diameters may be produced in which each of the different diameter wheels utilises the same configuration disc thus resulting in a substantial saving in production costs. Of course, different flange means need to be made for the different diameter wheels but such flanges are much less expensive components to produce.

In one embodiment the disc may be circular around its periphery and may be attached to the flange means around substantially the entire circumference of the disc, for example by welding.

Preferably though the disc is of a non-circular configuration around its periphery, and the method comprises attaching the disc to the flange means at a plurality of mounting stations provided by the flange means.

Thus the disc may be nominally square around its periphery, with the corners of the square removed to provide positions at which the disc is attached to the flange means at the mounting stations.

Where it is desired to provide a wheel which is adjustable, the disc is preferably attached to the flange means by reusable releasable fastening means such as threaded fasteners which may provide formations whereby the fasteners may readily be released and re-used, so as to provide an adjustable wheel. The attachment of the disc to flange means may utilise spacers as desired so that the wheel tracking of a pair of wheels on a common axle may be adjusted to a desired tracking.

However it is envisaged that the disc may be attached to the flange means by permanent fasteners by which we mean fasteners which cannot be readily released and re-used, such as rivets, for one example, or even threaded fasteners which when tightened to a desired torque, become permanently damaged and are not re-usable. For example a formation necessary to tighten and release such a fastener may break off so that the faster cannot then readily be released.

In this way, the wheel is not adjustable by for example a vehicle operator, although the disc and flange means may be separated e.g. by drilling out the fastener so that the wheel may be repaired for example, by replacing a component part thereof, i.e. the rim or the disc.

The flange means may each comprises a first generally circular part which is adapted to be secured to the rim and a second generally circular flange part which is adapted to extend radially inwardly of the rim and provide the mounting for the disc, the method comprising attaching the disc to the second flange part.

The flange means may be of alternative configurations by virtue of at least some of the second flange parts of the plurality of flange means being longer in a direction in use radially inwardly of the rim, than others of the second flange parts, so that the method may comprise selecting a flange means from the plurality of flange means, in which the second flange part is of a sufficient length so that in use the second flange part extends radially inwardly sufficiently far for the disc to be attached to the second flange part of the selected flange means.

A typical range of wheels comprises three wheels of different diameter. Thus the method may comprise providing at least three alternative configurations of flange means, the first configuration having a second flange part of a length greater than the length of the second flange part of the second configuration of flange means, and the second flange part of the second configuration flange means being of a length greater than the second flange part of the third configuration of flange means.

According to a second aspect of the invention we provide a method of making a wheel from a rim and a disc, utilising mounting means secured to the rim to provide a mounting for the disc in the rim, wherein the method comprises attaching the disc to the mounting means by permanent fasteners which cannot be readily released and re-used.

According to a third aspect of the invention we provide a set of wheels each comprising a rim, a disc and a flange means providing a mounting for the disc in the rim, each of the wheels of the set having a rim with a different nominal diameter, a disc of common configuration to all the wheels of the set, and a flange means of a different configuration to the flange means of the other wheel or wheels of the set.

DESCRIPTION OF THE PREFERRED EMBODIMENT

Figure 1:
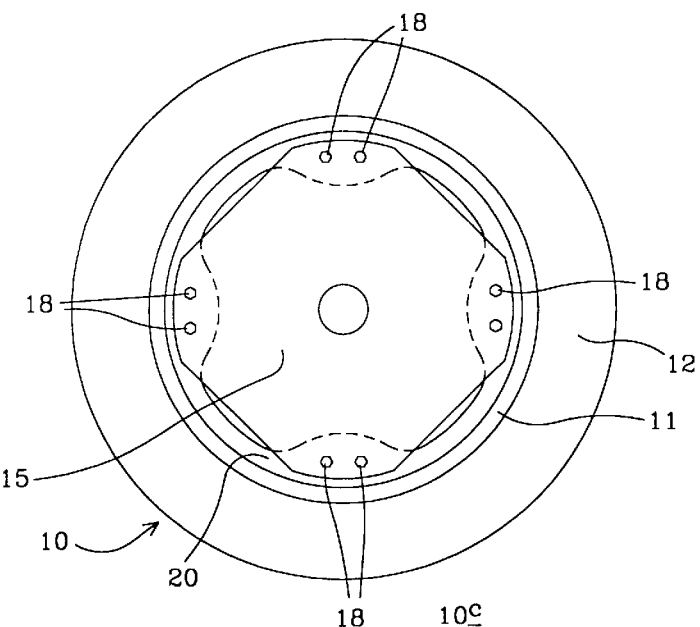
FIG. 1 is an illustrative side view of a tractor wheel which may be made by the method of the invention.

Referring to FIG. 1 of the drawings, there is shown a wheel 10, being a tractor wheel comprising a rim 11 on which a tyre 12 is mounted.

Within the rim 11, there is provided a disc 15 by means of which the wheel 10 may be secured relative to an axle on a tractor.

The disc 15 is of a nominally square configuration with the corners removed and the disc 15 is fixed in the rim 11 by a plurality of fastenings 18 which engage a flange means 20 at four mounting stations. The flange means 20 extends circumferentially around the rim 11 and is secured in the rim by means of welding.

Similar wheels are known in which the periphery of the disc 15 is generally circular and is secured to a flange means 20, by welding around substantially the entire periphery.

Figure 2:
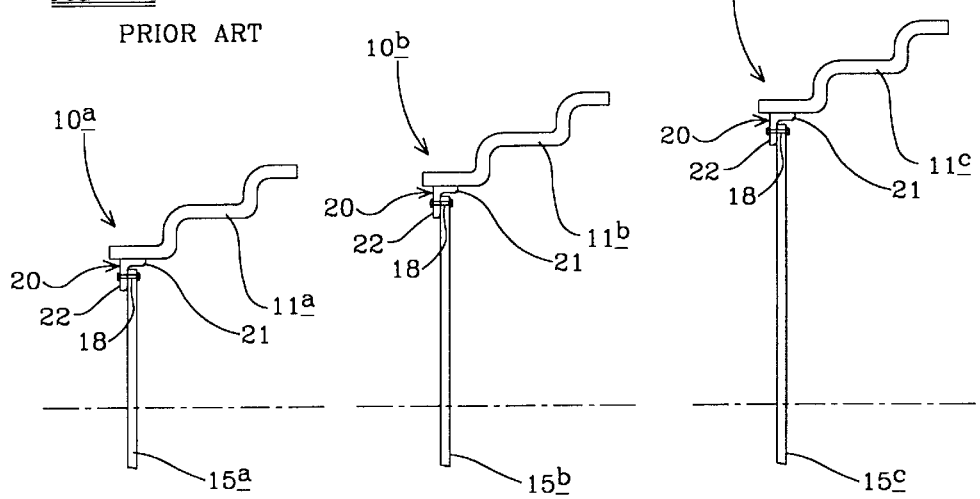
FIG. 2 shows how a range of three such wheels of different diameters may be made by a prior art method.

In order to produce a range of such wheels 10, of different diameters, conventionally it is essential to provide different configurations of discs 15 as well as different configuration rims 11, as shown in FIG. 2.

In FIG. 2, cross sections through three wheels 10a, 10b and 10c are indicated (only half the wheel being shown), the rims 11a, 11b and 11c being of different diameters. Rim 11b is of larger diameter than rim 11a, but of smaller diameter than 11c.

In each case, a wheel is produced to the required diameter by taking a rim 11a, 11b, 11c of the appropriate diameter, and securing in the rim a flange means 20. The flange means 20 comprises a first part 21 and second flange part 22, integrally provided preferably, by pressing for example.

The first part 21 is secured by welding in the rim 11a, 11b or 11c and the second part 22 is transverse to the first flange part 21 and extends radially inwardly of the rim 11a, 11b, 11c and provides a mounting for a disc 15a, 15b, 15c.

Because the flange means 20 are common to the three wheels 10a, 10b, 10c of the range, necessarily, three different size and configuration discs 15a, 15b and 15c are required in order to produce a range of three wheels.

The discs 15a, 15b and 15c are large and expensive to produce and accordingly production of three discs of alternative configuration, is expensive.

The discs 15a, 15b, 15c may be attached to the second part 22 of the flange means 20 in each respective wheel construction, either permanently e.g. by welding, or preferably by means of fasteners 18, utilising spacers as necessary so that the wheel produced is an adjustable wheel, the disc 15a, 15b, 15c being attachable to either side of the flange means 20 and spacers being used as required, so that the tracking distance between a pair of such wheels on a common axle may be adjusted.

In accordance with the invention, a range of three wheels 10a, 10b, 10c is produced without a requirement for producing three discs 15a, 15b, 15c of alternative configurations.

Figure 3:
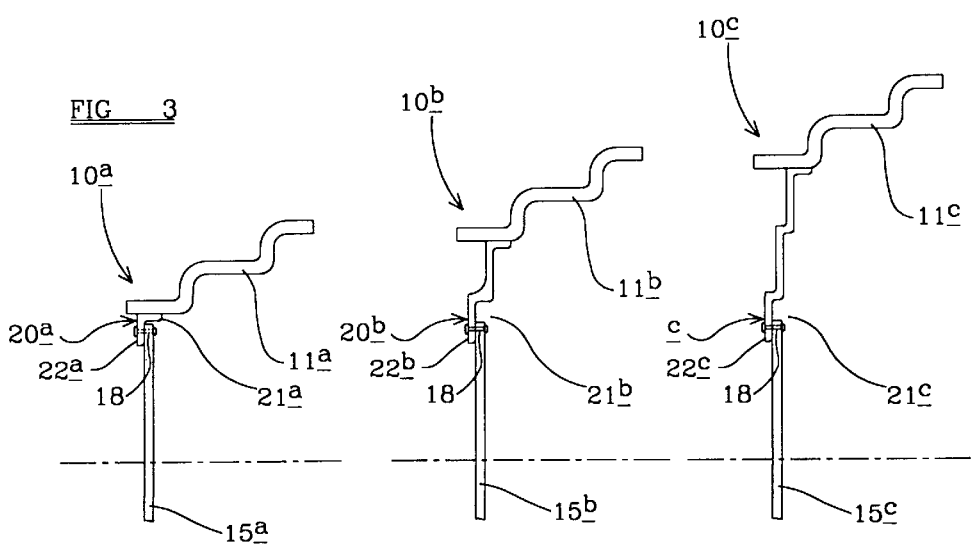
FIG. 3 shows how a range of three such wheels of different diameters are made by the method of the invention.

Referring particularly to FIG. 3, it can be seen that in each of the three wheel constructions 10a, 10b, 10c, a common disc 15 may be used. Thus tooling is only required to produce a disc 15 of a single configuration.

To achieve this, it is necessary to provide alternative flange means 20a, 20b and 20c for each of the three wheels sizes.

Each of the flange means 20a, 20b, 20c comprises a first part 21a, 21b, 21c which is secured to the respective rim 11a, 11b, 11c by welding for example, and a second flange part 22a, 22b, 22c which again is integrally provided with the first flange part 21a, 21b, 21c, but extends in use radially inwardly of the wheel 10a, 10b, 10c. The second part 22a of flange means 20a is shorter in length (radially inwardly of the wheel) than the second part 22b of the second flange means 20b. This in turn is of shorter length than the second flange part 22c of the flange means 20c of the wheel construction 10c, in which the rim 11c is of the greatest diameter.

Thus the flange means 20a, 20b and 20c are each of a different configuration so as to provide an appropriate mounting for a common disc 15 within the different diameter rims 11a, 11b and 11c.

The flange means 20a of the smallest diameter wheel construction 10a is of a simple L shape, with one limb of the L providing the flange part 21 a which is secured to the rim 11a, and the second limb of the L providing the second flange part 22a.

The second flange part 22b of the second flange means 20b is of a more convoluted configuration so as to provide the necessary strength for the longer second flange part 22b of the flange means 20b, and the second flange part 22c of the flange means 20c of the largest diameter wheel construction 10c is of even more convoluted configuration, so as to provide even greater strength to support the rim 11c relative to the disc 15.

In a method of making a wheel in accordance with the invention, the common disc 15 may be attached to the respective flange means 20a, 20b, 20c in any desired manner. Where the disc 15 is circular around its periphery, it may be welded to the respective flange means 20a, 20b, 20c. Alternatively, the disc 15 may be attached to its respective flange means 20a, 20b, 20c by reusable threaded fasteners such as nuts and bolts, and spacers may be utilised so that the wheel 10a, 10b, 10c is adjustable, for different track widths between a pair of such wheels on a common axis. In another arrangement, the disc 15 may be attached to its respective flange means 20a, 20b, 20c by fastenings which are not reusable. Examples of such fastenings are rivets, or fasteners which are threaded and which may be tightened to a predetermined torque before the fasteners become permanently damaged so that they cannot subsequently be readily released.

Thus where it is required to provide a wheel in which the track of the wheel is fixed rather than adjustable, non-reusable fasteners may be utilised.

Of course, with non-reusable fasteners, it would always be possible to separate the disc 15 and rim 11a, or 11b, or 11c by drilling out such fasteners for example, to facilitate repair of the wheel, but an operator of a tractor for example, would not be able readily to adjust the wheel track.

Various modifications may be made with departing from the scope of the invention.

In the example described with reference to FIG. 3 the drawings, a range of three wheel sizes may be produced from the components described. In another arrangement, only two wheels of alternative size, but utilising a common disc configuration may be made, or more than three wheels of different diameters may be produced.

Although as described, the flange means 20a, 20b and 20c have been secured in the rim 11a, 11b, 11c by welding, any other suitable technique for securing the flange means 20a, 20b, 20c in position in the rim may alternatively be used.

The flange means 20a and 20b and 20c obviously need to be of different configurations so as to enable a common disc 15 to be used with different diameter rims 11a, 11b, 11c, but one or more of the flange means 20a, 20b, 20c may be of alternative configurations to those shown in FIG. 3.

Although the invention has been described with reference to a tractor wheel, the invention may be applied to produce a range of wheels for other uses, from common components, for example, wheels for excavators, loaders or other working machines, or for vehicles in general. Preferably though the invention is utilised to produce a range of ground engaging wheels.

As shown in FIGS. 2 and 3, the disc 15 is of a simple plain construction, but it will be appreciated by those skilled in the art, that a disc 15 more usually is of a complex shape which is what makes its production in three alternative sizes, so expensive.

What is claimed is:

1. A method of making a set of wheels from a set of rims of different nominal diameters, a set of flange means of different dimensions, and discs of substantially similar nominal diameters, the method comprising selecting for each rim a flange means of an appropriate dimension in a radial direction, such that when a flange means is secured to a rim, the flange means provides a mounting for a disc, and mounting a disc in each rim by attaching the disc to the flange means.

2. A method according to claim 1 wherein the disc is of a non-circular configuration around its periphery, and the method comprises attaching the disc to the flange means at a plurality of mounting stations provided by the flange means.

3. A method according to claim 2 wherein the disc is nominally square around its periphery with the corners of the square removed to provide positions at which the disc is attached to the flange means at the mounting stations.

4. A method according to claim 2 wherein the disc is attached to the flange means by reusable releasable fastening means so as to provide an adjustable wheel.

5. A method according to claim 4 wherein the fastening means comprise threaded fasteners.

6. A method according to claim 2 wherein the disc is attached to the flange means by permanent fasteners.

7. A method according to claim 1 wherein the flange means each comprises a first generally circular part which is adapted to be secured to the rim and a second generally circular flange part which is adapted to extend radially inwardly of the rim and provide the mounting for the disc, the method comprising attaching the disc to the second flange part.

8. A method of making a wheel from a rim selected from a plurality of rims of different nominal diameters, a plurality of flange means of different configurations, and a disc, each of the flange means comprising a first generally circular part which is adapted to be secured to the rim and a second generally circular flange part which is adapted to extend radially inwardly of the rim and provide the mounting for the disc, at least some of the second flange parts of the plurality of flange means being longer than others of the second flange parts, the method comprising selecting a flange means from the plurality of flange means a flange means of an appropriate configuration so that when the flange means is secured to the rim, the flange means provides a mounting for the disc, the second flange part being a sufficient length so that in use the second flange part extends radially inwardly sufficiently far for the disc to be attached to the second flange part of the selected flange means, and mounting the disc in the rim by attaching the disc to the second flange part of the flange means.

9. A method of making a wheel from a rim selected from a plurality of rims of different nominal diameters, a plurality of flange means of different configurations, and a disc, each of the flange means comprising a first generally circular part which is adapted o be secured to the rim and a second generally circular flange part which is adapted to extend radially inwardly of the rim and provide the mounting for the disc, the method comprising providing at least three alternative configurations of the flange means, the first configuration having a second flange part of a length greater than the length of the second flange part of the second configuration of the flange means, and the second flange part of the second configuration of the flange means being a length greater than the second flange part of the third configuration of the flange means, selecting from the plurality of flange means a flange means of an appropriate configuration so that when the flange means is secured to the rim, the flange means provides a mounting for the disc, and mounting the disc in the rim by attaching the disc to the second flange part of the flange means.

10. A method of making sets of wheels from a plurality of rims of different nominal diameters, a plurality of mounting means of different nominal dimensions, and a disc of a single nominal diameter, utilizing mounting means secured to the rim to provide a mounting for the disc in the rim, wherein the method comprises attaching the disc to the mounting means by permanent fasteners which cannot be readily released and re-used.

11. A set of wheels each comprising a rim, a disc and a flange means providing a mounting for the disc in the rim, each of the wheels of the set having a rim with a different nominal diameter, a disc of common configuration to all the wheels of the set, and a flange means of a different configuration to the flange means of the other wheels of the set.

* * * * *